3,061,244
TRAILING EDGE FLAPS FOR AIRPLANE WINGS
Heinz Max, Friedrichshafen, Germany, assignor to Dornier-Werke G.m.b.H., Friedrichshafen, Germany
Filed Nov. 10, 1961, Ser. No. 151,514
Claims priority, application Germany Nov. 12, 1960
6 Claims. (Cl. 244—42)

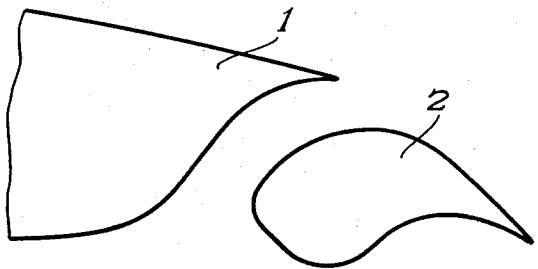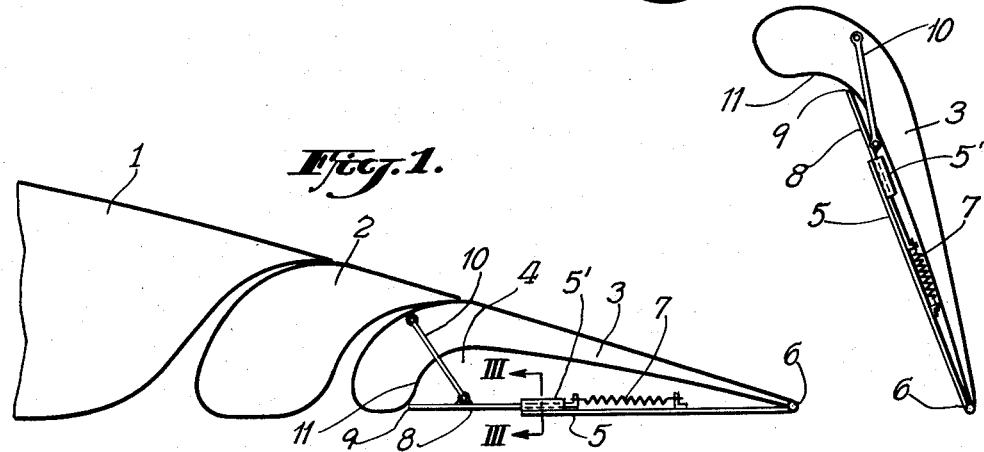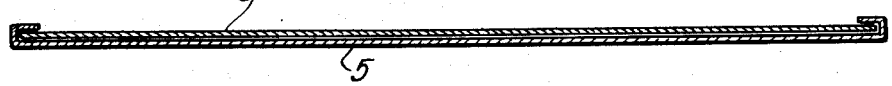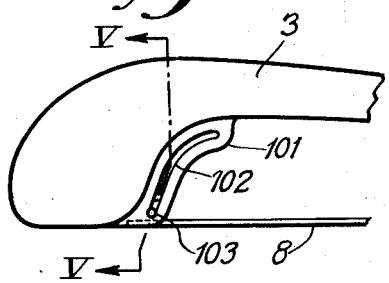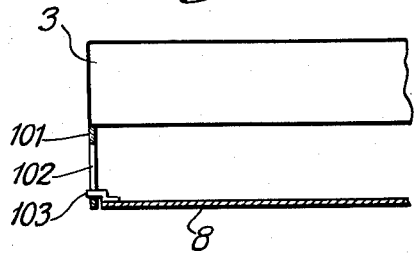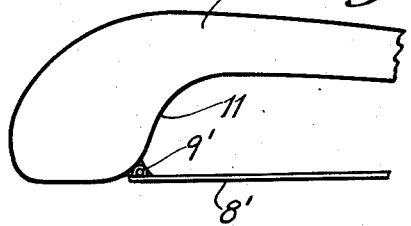
INVENTOR.
HEINZ MAX.
BY K. A. Mayr
ATTORNEY.

The present invention relates to an airplane wing having one or more flaps arranged at the trailing edge of the wing, the flaps being located one behind the other in case more than one flap are provided. The invention more particularly relates to a novel structure of the rearmost flap in order to increase the effect of the propeller slip stream during normal flight, when the flap is retracted, as well as during take-off and landing and other maneuvers when the flap is extended.

In order to increase the lifting effect of the propeller slip stream when the flap at the trailing edge of the airplane wing is extended, it is proposed in the patent application of Silvius Dornier et al., Serial No. 130,785, filed August 11, 1961, to make the underside of the flap stark concave whereby the angle between the upper surface and the bottom surface at the trailing edge of the flap becomes very small. In this patent application it is also proposed to provide a shield-like element which is hinged to the rear edge of the flap and covers and closes the cavity at the underside of the flap when the flap is retracted in order to avoid undesired air turbulence caused by the cavity and which moves into the cavity when the flap is extended. This element, however, leaves a gap at the forward edge unless the radius of the curvature of the forward portion of the cavity coincides with the normal to the swing axis of the element.

It is an object of the present invention to provide an improved cover means for the cavity on the underside of a flap provided at the rear edge of an airplane wing which cover means completely closes the cavity when the flap is in retracted position. This object is obtained by composing the cover means of two sheetlike elements one of which is swingably connected to the trailing edge of the flap, the second element being parallel to and slidable on the first element and having a leading edge sliding on the curved forward portion of the concavely curved underside of the flap. In order to assure contact between the leading edge of the second sheetlike element and the underside of the flap a spring is preferably provided pressing the leading edge of the second element against the underside of the flap. This arrangement effectively prevents formation of a gap or slot between the leading edge of the cover means and the forward portion of the concave underside of the flap when the flap is in retracted position. When the flap is protracted the second element of the cover means moves toward the trailing edge of the wing flap so that the cover means becomes less wide and moves into the cavity to abut against the underside of the flap. A mechanism may be provided for coupling the cover means and the flap for simultaneous movement thereof. This mechanism may be omitted and the air pressure may be relied upon to press the cover means into the cavity and to reduce the width of the telescoping cover means against the action of the spring which tends to extend the telescopingly connected elements of the cover means.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagrammatic cross sectional illustration of the trailing edge portion of an airplane wing having two flaps, the rearmost flap being shaped and provided with cover means according to the invention, the figure showing the flaps in retracted position.

FIG. 2 diagrammatically shows the mechanism illustrated in FIG. 1 in extended position.

FIG. 3 diagrammatically shows a section of the cover means, the section being made along line III—III of FIG. 1.

FIG. 4 is a diagrammatic illustration of a modified forward part of the cover means according to the invention.

FIG. 5 is a sectional view of the mechanism shown in FIG. 4, the section being made along line V—V of said figure.

FIG. 6 is a cross sectional view of another modification of the forward element of cover means according to the invention.

Referring more particularly to FIGS. 1 and 2 of the drawing, numeral 1 designates the rear portion of an airplane wing having flaps 2 and 3 connected thereto in the conventional manner, not shown, the flaps 3 forming the trailing edge of the wing. The underside of the rearmost flap is stark concave, forming a cavity 4 and forming with the upper side of the flap 3 a very acute angle. This configuration of the rearmost flap substantially increases the diversion of the propeller slip stream when the flap 3 is extended.

When the flap 3 is in retracted position the cavity 4 is closed by cover means comprising a platelike rear portion 5 which is hinged at 6 to the trailing edge of the flap 3 and a platelike forward portion 8 which is telescopingly connected to the portion 5. The telescoping connection, more clearly shown in FIG. 3, maintains close contact between the platelike portions 5 and 8. A spring 7 presses the portion or element 8 forward relative to the portion or element 5 and presses the forward edge 9 of the element 8 against the stark curved forward part 11 of the underside of the flap 3.

When the flaps are extended, as shown in FIG. 2, the air pressure presses the cover means 5, 8 into the cavity 4 and into abutment with the relatively plane portion of the underside of the flap 3. The element 8 is linked to the flap 3 by a link 10. The forward edge 9 of the element 8 remains in contact with the curved portion 11 of the underside of the flap 3 during the movement of the cover means into the cavity 4, the contact pressure being effected by the spring 7.

In lieu of the link 10 guides 101 as shown in FIGS. 4 and 5 may be mounted on the underside of the flap 3, each guide having a slot 102 receiving a pin 103 mounted to the end of the element 8.

As shown in FIG. 6, the forward edge of the element 8 may be provided with rollers 9' which roll on the curved surface portion 11 and facilitate the movement of the cover means 5, 8.

The invention is not limited to an airplane wing having two flaps. It may also be used in connection with airplane wings having only one flap or having more than two flaps.

I claim:
1. In an airplane wing having at least one flap at the trailing edge, said flap having a railing edge and an underside having at least a concavely curved forward portion and forming a cavity at the underside of the flap, cover means for covering said cavity when said flap is in retracted position and adapted to move into said cavity adjacent to said underside upon extension of said flap, said cover means comprising a platelike rear portion having a rear edge hingedly connected to the trailing edge of said flap, and a platelike forward portion slidably connected in substantially parallel relation with said rear portion and having a forward edge contacting the forward portion of the underside of the flap.

2. In an airplane wing as defined in claim 1, guide means connected to said rear portion of said cover means for guiding the forward portion of said cover means.

3. In an airplane wing as defined in claim 1, resilient means connected to said rear portion and to said forward portion of said cover means for pressing the forward edge of said forward portion of said cover means against the forward portion of the underside of said flap.

4. In an airplane wing as defined in claim 1, link means interconnecting said platelike forward portion of said cover means and said flap for guiding the movement of said platelike forward portion upon retraction and extension of said flap.

5. In an airplane wing as defined in claim 1, roller means connected to the forward edge of the forward portion of said cover means and adapted to roll on the forward portion of the underside of the flap.

6. In an airplane wing as defined in claim 1, guide means connected to the forward portion of the underside of the flap, and means connected to the forward edge of the forward portion of said cover means and engaged by said guide means for guiding the movement of said platelike forward portion upon retraction and extension of said flap.

References Cited in the file of this patent

FOREIGN PATENTS 715,266     Germany _____ Dec. 18, 1941